US008861051B1

(12) United States Patent
Chang et al.

(10) Patent No.: US 8,861,051 B1
(45) Date of Patent: Oct. 14, 2014

(54) ROLLER ASSEMBLY

(71) Applicant: Foxlink Image Technology Co., Ltd., New Taipei (TW)

(72) Inventors: Hung Ming Chang, New Taipei (TW); Che Pin Hung, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 13/966,728

(22) Filed: Aug. 14, 2013

(51) Int. Cl.
*H04N 1/04* (2006.01)
*H04N 1/00* (2006.01)

(52) U.S. Cl.
CPC .................. *H04N 1/00557* (2013.01)
USPC ........... 358/498; 358/474; 358/496; 271/110; 399/367

(58) Field of Classification Search
CPC .......... H04N 1/00567; H04N 1/00591; H04N 1/00615; H04N 1/0062; H04N 1/00631; H04N 1/12; H04N 1/00543; H04N 1/00623; H04N 1/00596; H04N 1/00612; H04N 1/00655; H04N 1/0405; H04N 1/193; H04N 2201/008
USPC ......... 358/498, 1.13, 496, 474; 271/109, 272, 271/114, 10.09, 10.13, 110, 225
See application file for complete search history.

(56) References Cited

U.S. PATENT DOCUMENTS

| 4,024,824 A * | 5/1977 | Haff, Jr. .................... 112/470.32 |
| 4,981,116 A * | 1/1991 | Trinquard .................. 123/90.31 |
| 5,311,330 A * | 5/1994 | Yeh ................................. 358/498 |
| 5,331,374 A * | 7/1994 | Abe et al. ....................... 399/124 |
| 5,522,668 A * | 6/1996 | Nawa et al. .................... 403/256 |
| 5,632,479 A * | 5/1997 | Kubota et al. ................. 271/296 |
| 5,738,454 A * | 4/1998 | Zepeda et al. ................. 400/625 |
| 6,025,936 A * | 2/2000 | Ishida ............................ 358/498 |
| 6,102,590 A * | 8/2000 | Harris et al. .................... 400/56 |
| 7,025,345 B2 * | 4/2006 | Frazier et al. .................. 271/109 |
| 7,571,905 B2 * | 8/2009 | Kim ................................. 271/117 |
| 7,878,499 B2 * | 2/2011 | Sheng ............................ 271/121 |
| 7,887,042 B2 * | 2/2011 | Sheng et al. ................... 271/121 |
| 7,905,482 B2 * | 3/2011 | Matsumoto .................... 271/213 |
| 8,196,918 B2 * | 6/2012 | Arimura et al. ................ 271/124 |
| 8,305,658 B2 * | 11/2012 | Cheng ............................ 358/498 |
| 8,430,401 B1 * | 4/2013 | Kuo ................................. 271/226 |
| 2010/0014128 A1 * | 1/2010 | Huang et al. .................. 358/498 |
| 2012/0287454 A1 * | 11/2012 | Arimura ...................... 358/1.13 |

* cited by examiner

*Primary Examiner* — Negussie Worku

(74) *Attorney, Agent, or Firm* — WPAT, P.C.; Anthony King; Kay Yang

(57) ABSTRACT

A roller assembly includes a roller shaft, a roller base and at least one roller. The roller shaft defines at least one clipping slot. The roller shaft passes rearward through the roller base to rotatably mount the roller base to the roller shaft. An inside of the roller base extends forward to form an elastic arm. A free end of the elastic arm projects beyond a front surface of the roller base. The free end of the elastic arm defines a hook portion hooked in the clipping slot to restrain the roller base on the roller shaft. The roller is set around the roller base. When the roller assembly is disassembled, press down upon the free end of the elastic arm to make the hook portion project out of the clipping slot, so that the roller base together with the rollers is disassembled from the roller shaft.

8 Claims, 5 Drawing Sheets

US 8,861,051 B1

ROLLER ASSEMBLY

BACKGROUND OF THE INVENTION

1. Field of the Invention

The present invention generally relates to a roller assembly, and more particularly to a roller assembly which is applied to a scanner.

2. The Related Art

A conventional roller assembly includes a roller shaft, a roller base and a plurality of rollers. The roller shaft defines two spaced ring-shaped limiting slots. The roller assembly further includes two limiting elements. Two opposite sides of an inner surface of the roller base define two blocking portions. When the conventional roller assembly is assembled, the roller base is rotatably mounted to the roller shaft. The rollers are set around the roller base. The limiting elements are limited in the two limiting slots of the roller shaft. The two blocking portions of the roller base resist between the two limiting elements so as to restrain the roller base on the roller shaft. When the conventional roller assembly is disassembled, the two limiting elements are disassembled from the two limiting slots of the roller shaft. The roller base is disassembled from the roller shaft. The rollers are disassembled from the roller base.

However, the conventional roller assembly restrains the roller base on the roller shaft by virtue of the two blocking portions of the roller base resisting between the two limiting elements, it will increase a cost of the conventional roller assembly to manufacture the two limiting elements. In addition, in the process of assembling and disassembling the conventional roller assembly, it increases procedures of assembling the limiting elements in the two limiting slots of the roller shaft and disassembling the limiting elements from the two limiting slots of the roller shaft. As a result, the conventional roller assembly has complex assembly and disassembly procedures that increases working hours of manufacturing the conventional roller assembly and further increases a manufacturing cost of the conventional roller assembly.

Therefore, it is necessary to provide a roller assembly which has simple assembly and disassembly procedures for lowering the working hours of manufacturing the conventional roller assembly so as to improve a manufacturing efficiency of the conventional roller assembly and further decreases the manufacturing cost of the conventional roller assembly.

SUMMARY OF THE INVENTION

An object of the present invention is to provide a roller assembly. The roller assembly includes a roller shaft, a roller base and at least one roller. The roller shaft defines at least one clipping slot. The roller shaft passes rearward through the roller base to rotatably mount the roller base to the roller shaft. An inside of the roller base extends forward to form an elastic arm. A free end of the elastic arm projects beyond a front surface of the roller base. The free end of the elastic arm defines a hook portion hooked in the clipping slot to restrain the roller base on the roller shaft. The roller is set around the roller base.

As described above, when the roller assembly is assembled, the hook portion of the elastic arm is hooked in the clipping slot to restrain the roller base on the roller shaft. Moreover, when the roller assembly is disassembled, press down upon the free end of the elastic arm to make the hook portion of the elastic arm project out of the clipping slot, so that the roller base together with the rollers is disassembled from the roller shaft.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
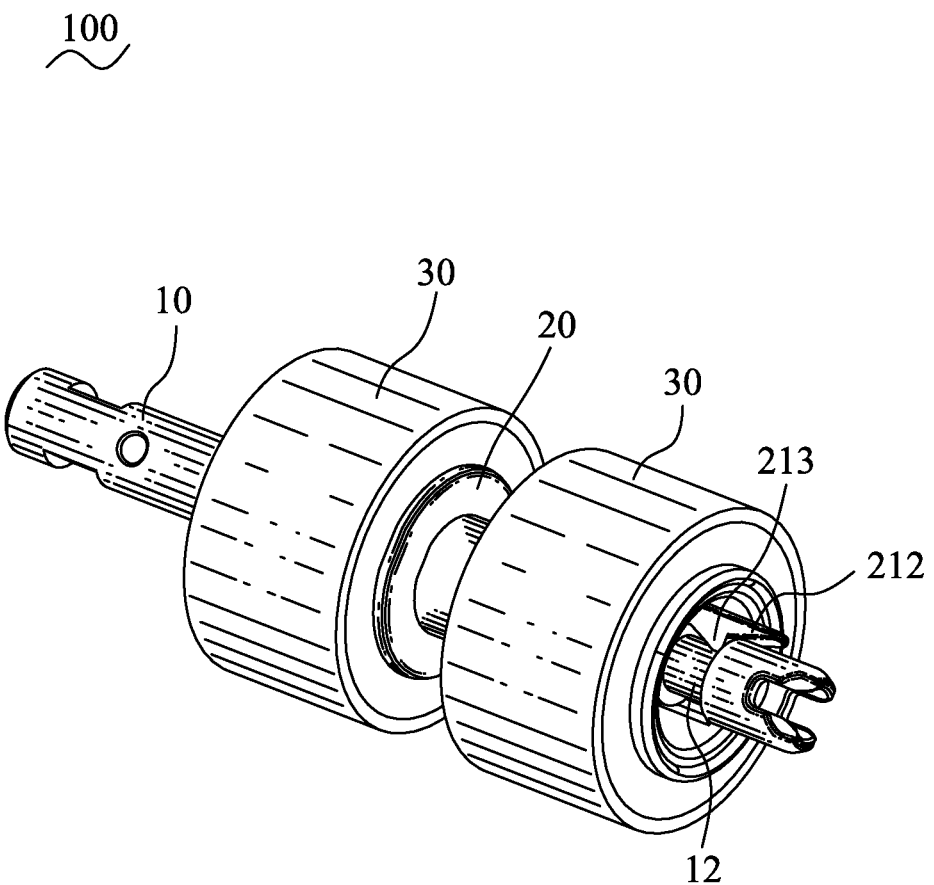
FIG. 1 is a perspective view of a roller assembly in accordance with an embodiment of the present invention.

With reference to FIG. 1, a roller assembly 100 in accordance with an embodiment of the present invention is shown. The roller assembly 100 in accordance with the embodiment of the present invention includes a roller shaft 10, a roller base 20 and at least one roller 30.

Figure 2:
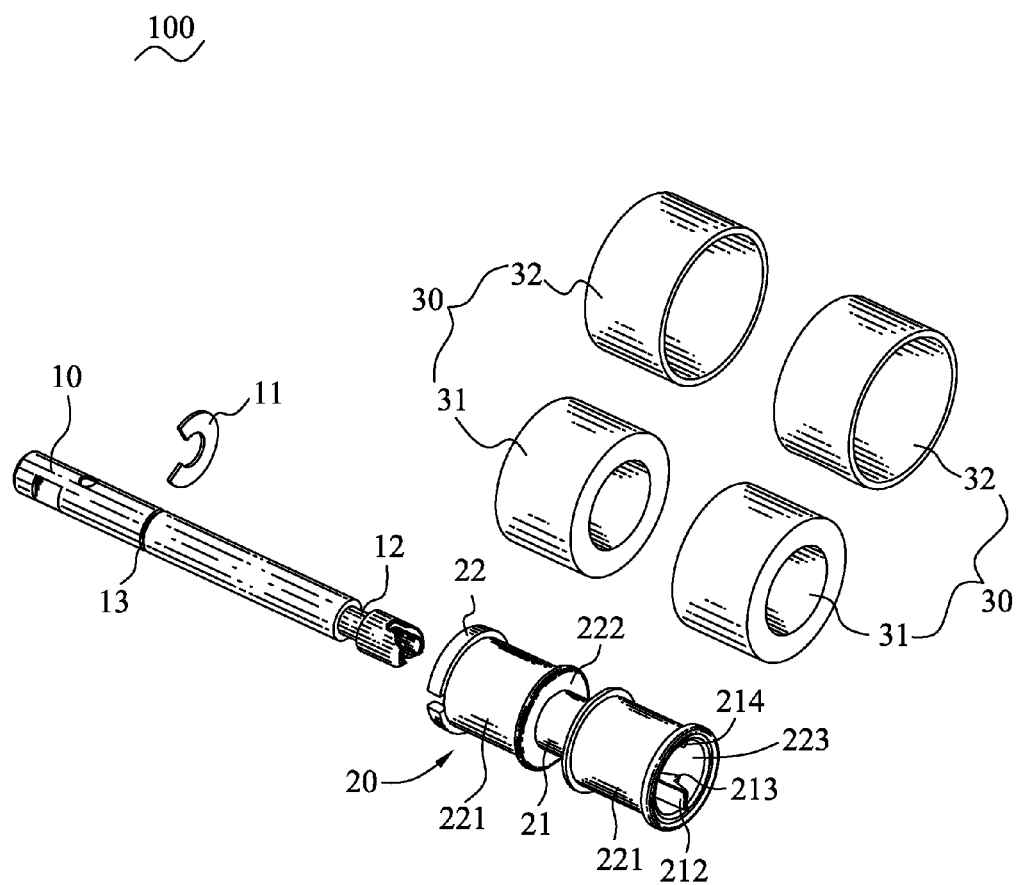
FIG. 2 is an exploded view of the roller assembly in accordance with the embodiment of the present invention of FIG. 1.
Figure 3:
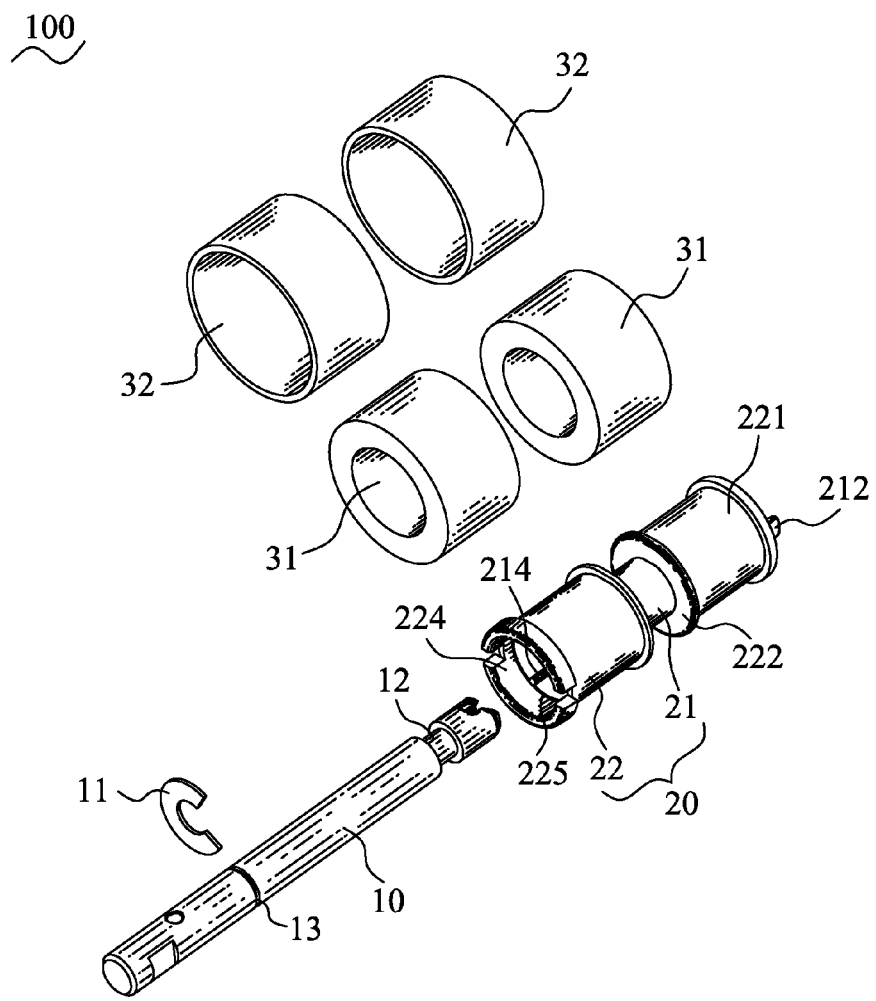
FIG. 3 is another exploded view of the roller assembly in accordance with the embodiment of the present invention of FIG. 1.
Figure 4:
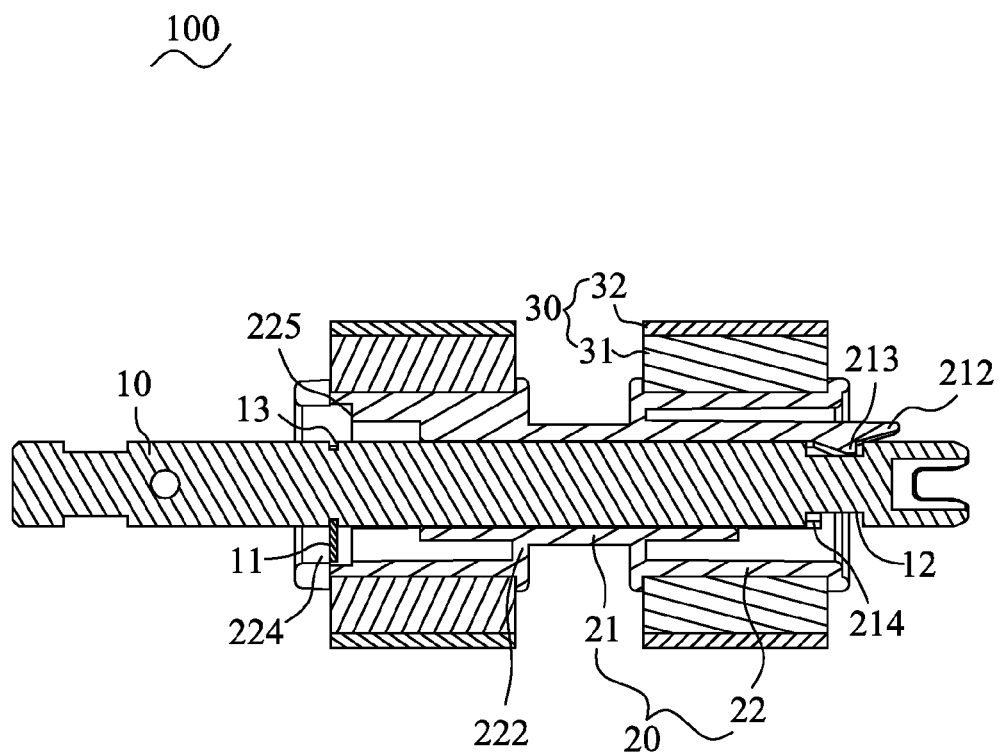
FIG. 4 is a sectional view of the roller assembly in accordance with the embodiment of the present invention of FIG. 1.
Figure 5:
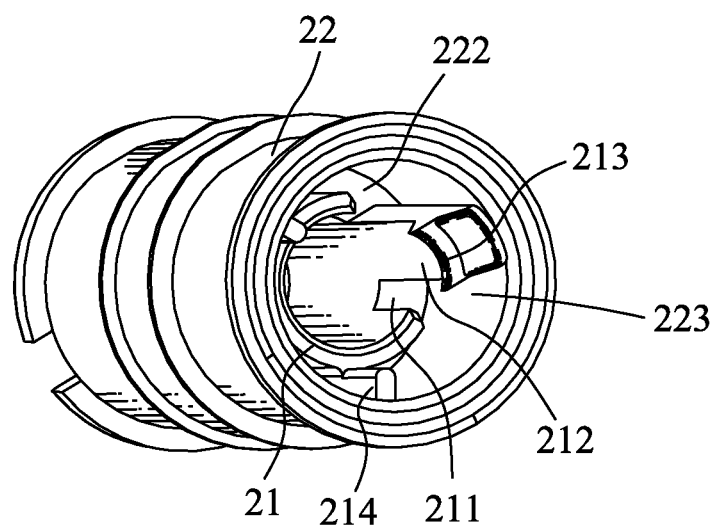
FIG. 5 is a perspective view of a roller base of the roller assembly in accordance with the embodiment of the present invention of FIG. 1.

Referring to FIG. 2 to FIG. 4, the roller shaft 10 defines at least one ring-shaped clipping slot 12 and defines one ring-shaped limiting slot 13 located in rear of and away from the clipping slot 12. The roller assembly 100 further includes a limiting element 11. In this embodiment, the roller shaft 10 defines one ring-shaped clipping slot 12. The limiting element 11 is a clasp. The limiting element 11 is limited in the limiting slot 13.

Referring to FIG. 1 and FIG. 4, the roller base 20 is of a hollow shape. The roller shaft 10 passes rearward through the roller base 20 to rotatably mount the roller base 20 to the roller shaft 10. An inside of the roller base 20 extends forward to form an elastic arm 212. A free end of the elastic arm 212 projects beyond a front surface of the roller base 20. The free end of the elastic arm 212 defines a hook portion 213. The hook portion 213 is hooked in the clipping slot 12 to restrain the roller base 20 on the roller shaft 10.

Referring to FIG. 2 to FIG. 5, preferably, the roller base 20 has a tube-shaped connecting portion 21. A front end and a rear end of the connecting portion 21 are respectively connected with a tube-shaped front sleeve portion 22 and a tube-shaped rear sleeve portion 22. A middle of an outer periphery of each of the front and rear sleeve portions 22 is concaved inward to form a ring-shaped assembling groove 221. The front and rear sleeve portions 22 have two opposite ring-shaped sidewalls 222 spaced from each other and respectively connected with the outer periphery of the connecting portion 21. Each of the front and rear sleeve portions 22 has a receiving space 223 therein. The front end and the rear end of the connecting portion 21 respectively project into the two receiving spaces 223 of the front and rear sleeve portions 22. The front end of the connecting portion 21 defines a gap 211. A front surface of the sidewall 222 of the front sleeve portion 22 connected with the front end of the connecting portion 21 extends forward to form the elastic arm 212 partially projecting downward into the gap 211. A free end of the elastic arm 212 projects out of the front sleeve portion 22.

Referring to FIG. 2 to FIG. 5, the hook portion 213 shows a wedge shape. The hook portion 213 hooks around a ring-shaped inner sidewall of the clipping slot 12 and a front end of the hook portion 213 resists against a front sidewall of the clipping slot 12 so as to rotatably restrain the hook portion 213 in the clipping slot 12. A free end of the elastic arm 212 projects out of the front sleeve portion 22. An outer surface of the front end of the connecting portion 21 protrudes towards an inner sidewall of the front sleeve portion 22 to form two ribs 214 connecting with the inner sidewall of the front sleeve portion 22. An outer surface of the rear end of the connecting portion 21 protrudes towards an inner sidewall of the rear sleeve portion 22 to form a plurality of ribs 214 connecting with the inner sidewall of the rear sleeve portion 22. Inner ends of the ribs 214 are connected with two inner surfaces of the two ring-shaped sidewalls 222 of the front and rear sleeve portions 22. And outer ends of the ribs 214 project beyond the front end and the rear end of the connecting portion 21. A rear end of the inner sidewall of the rear sleeve portion 22 is recessed inward to form a ring-shaped blocking groove 224. A ring-shaped front sidewall of the blocking groove 224 is designated as a blocking wall 225. The limiting element 11 resists against the blocking wall 225 of the roller base 20 through the blocking groove 224 so as to restrain the roller base 20 from sliding rearward.

Referring to FIG. 1 and FIG. 2, in this embodiment, the roller assembly 100 includes two rollers 30. The roller 30 set around the roller base 20 includes a hollow cylinder-shaped foam 31 and a rubbing portion 32. The foam 31 is set in the assembling groove 221, and the rubbing portion 32 surrounds the foam 31.

Referring to FIG. 1 and FIG. 4, when the roller assembly 100 is assembled, firstly, mount the two rollers 30 to the roller base 20. Then move the roller base 20 rearward along the roller shaft 10. Lastly, when the limiting element 11 resists against the blocking wall 225, the hook portion 213 of the elastic arm 212 is located in the clipping slot 12, and the hook portion 213 of the elastic arm 212 is hooked in the clipping slot 12 under an elastic force action of the elastic arm 212 so as to restrain the roller base 20 on the roller shaft 10. When the roller assembly 100 is disassembled, press down upon the free end of the elastic arm 212 to make the hook portion 213 of the elastic arm 212 projects out of the clipping slot 12. Then move the roller base 20 together with the rollers 30 forward along the roller shaft 10. So that the roller base 20 together with the rollers 30 is disassembled from the roller shaft 10.

Referring to FIG. 1, the roller assembly 100 in accordance with the present invention is a pickup roller assembly. The roller shaft 10 of the roller assembly 100 is rotated to drive the roller base 20 together with the rollers 30 to rotate by virtue of a motor (not shown) for making the roller assembly 100 realize a pickup function.

As described above, when the roller assembly 100 is assembled, the hook portion 213 of the elastic arm 212 is hooked in the clipping slot 12 to restrain the roller base 20 on the roller shaft 10. Moreover, when the roller assembly 100 is disassembled, press down upon the free end of the elastic arm 212 to make the hook portion 213 of the elastic arm 212 project out of the clipping slot 12, so that the roller base 20 together with the rollers 30 is disassembled from the roller shaft 10.

What is claimed is:

1. A roller assembly, comprising:
   a roller shaft defining at least one clipping slot;
   a roller base, the roller shaft passing rearward through the roller base to rotatably mount the roller base to the roller shaft, an inside of the roller base extending forward to form an elastic arm, a free end of the elastic arm projecting beyond a front surface of the roller base, the free end of the elastic arm defining a hook portion hooked in the clipping slot to restrain the roller base on the roller shaft; and
   at least one roller set around the roller base,
   wherein the roller base has a tube-shaped connecting portion, a front end and a rear end of the connecting portion are respectively connected with a tube-shaped front sleeve portion and a tube-shaped rear sleeve portion, the front and rear sleeve portions have two opposite ring-shaped sidewalls respectively connected with the outer periphery of the connecting portion, each of the front and rear sleeve portions has a receiving space therein, the front end and the rear end of the connecting portion respectively project into the two receiving spaces of the front and rear sleeve portions.

2. The roller assembly as claimed in claim 1, wherein the front end of the connecting portion defines a gap, a front surface of the sidewall of the front sleeve portion connected with the front end of the connecting portion extends forward to form the elastic arm partially projecting downward into the gap, the free end of the elastic arm projects out of the front sleeve portion.

3. The roller assembly as claimed in claim 1, wherein an outer surface of the front end of the connecting portion protrudes towards an inner sidewall of the front sleeve portion to form two ribs connecting with the inner sidewall of the front sleeve portion, an outer surface of the rear end of the connecting portion protrudes towards an inner sidewall of the rear sleeve portion to form a plurality of ribs connecting with the inner sidewall of the rear sleeve portion, inner ends of the ribs are connected with two inner surfaces of the two ring-shaped sidewalls of the front and rear sleeve portions, and outer ends of the ribs project beyond the front end and the rear end of the connecting portion.

4. The roller assembly as claimed in claim 1, wherein an outer periphery of each of the front and rear sleeve portions is concaved inward to form a ring-shaped assembling groove, the roller includes a hollow cylinder-shaped foam and a rubbing portion, the foam is set in the assembling groove, and the rubbing portion surrounds the foam.

5. The roller assembly as claimed in claim 1, wherein the roller shaft defines one ring-shaped limiting slot located in rear of and away from the clipping slot, the roller assembly further includes a limiting element, the limiting element is limited in the limiting slot.

6. The roller assembly as claimed in claim 5, wherein the limiting element is a clasp.

7. The roller assembly as claimed in claim 5, wherein the roller base has a rear sleeve portion, a rear end of an inner sidewall of the rear sleeve portion is recessed inward to form a ring-shaped blocking groove, a ring-shaped front sidewall of the blocking groove is designated as a blocking wall, the limiting element resists against the blocking wall of the roller base through the blocking groove.

8. The roller assembly as claimed in claim 1, wherein the hook portion shows a wedge shape, the hook portion hooks around a ring-shaped inner sidewall of the clipping slot and a front end of the hook portion resists against a front sidewall of the clipping slot.

* * * * *